United States Patent [19]

Pardee

[11] 4,232,072

[45] Nov. 4, 1980

[54] PROTECTIVE COMPOSITIONS FOR RECORDING

[75] Inventor: Robert P. Pardee, Boulder, Colo.

[73] Assignee: Ball Corporation, Muncie, Ind.

[21] Appl. No.: 915,629

[22] Filed: Jun. 14, 1978

Related U.S. Application Data

[63] Continuation-in-part of Ser. No. 722,174, Sep. 10, 1976, Pat. No. 4,096,079.

[51] Int. Cl.$^2$ .............. G11B 5/70; C10M 1/32; G11B 5/72; B32B 3/02
[52] U.S. Cl. .................... 428/65; 252/54.6; 360/134; 360/135; 427/131; 427/128; 428/422; 428/900
[58] Field of Search ............ 428/900, 64, 65, 422; 427/131, 128; 360/134, 135; 252/54.6

[56] References Cited

U.S. PATENT DOCUMENTS

| | | | |
|---|---|---|---|
| 2,710,877 | 6/1955 | Young | 252/54.6 |
| 2,921,957 | 1/1960 | O'Rear | 252/54.6 |
| 2,927,894 | 3/1960 | Neunherz | 252/54.6 |
| 3,081,342 | 3/1963 | Ver Nooy | 252/54.6 |
| 3,124,533 | 3/1964 | Metro | 252/54.6 |
| 3,130,159 | 4/1964 | Stedt | 252/54.6 |
| 3,412,140 | 11/1968 | Seil | 252/54.6 |
| 3,452,074 | 6/1969 | Welsner | 252/54.6 |
| 3,490,946 | 1/1970 | Wolff | 428/900 |
| 3,523,086 | 8/1970 | Bisschops | 428/900 |
| 3,547,693 | 12/1970 | Hugenard | 428/900 |
| 3,862,860 | 1/1975 | Pardee | 428/900 |
| 3,998,989 | 12/1976 | Pardee | 428/900 |
| 4,007,313 | 2/1977 | Higuchi | 428/900 |
| 4,091,158 | 5/1978 | Kasuga | 428/900 |
| 4,096,079 | 6/1978 | Pardee | 428/900 |

OTHER PUBLICATIONS

Loram, Thomas PCT WO79/00075 2/22/79.

*Primary Examiner*—Ellis P. Robinson
*Attorney, Agent, or Firm*—Gilbert E. Alberding

[57] ABSTRACT

An article of manufacture and a method are disclosed herein for improving lubricity and wear resistance of a given substrate by applying thereto a composition comprising essentially about 0.001 to about 3.000 weight percent of a composition containing 10 to 100 weight percent of a carboxylate ester, 0 to about 90 weight percent of a tetrafluorethylene telomer, and 0 to about 90 weight percent of an antistatic agent selected from the group consisting of amines, fatty quaternary ammonium compounds, fatty acid esters, phosphate esters and ethoxylated compounds, and about 97.00 to about 99.999 weight percent of a solvent therefor, and removing the volatile solvent to produce a thin, dry coating upon said substrate. The compositions herein disclosed have been found to be most effective as preservatives for coating gramophone or phonograph records which provide marked reduction of record groove wear while substantially minimizing noise and harmonic distortion.

9 Claims, No Drawings

PROTECTIVE COMPOSITIONS FOR RECORDING

BACKGROUND OF THE INVENTION

Related Patent Applications

This invention is a continuation-in-part application of my copending case, Ser. No. 722,174, filed Sept. 10, 1976 now U.S. Pat. No. 4,096,079 and is directly related to my other copending patent application Ser. No. 924,025 filed July 12, 1978 which is a continuation in part of Ser. No. 824,886, filed Aug. 15, 1977 now abandoned.

Field of the Invention

The present invention pertains generally to lubrication of specified substrates and, more particularly, to an improved lubrication composition and method of its application. The improved, wear-resistant, low friction substrates have a coating provided by such composition, said substrates including sound and video recordings such as gramophone or phonographic records, video discs and the like.

Description of the Prior Art

Lubrication of various substrates, and particularly of substrates upon which recorded signals have been stored and from which said signals can be recalled by dynamic means, has not been generally recognized and where attempts have been made to lubricate such substrates they have not proven fully satisfactory. In particular, substrates possessing this special problem include synthetic, natural and combinations of the thermoplastic materials and include resins, shellac, polyvinyl acetate, polyvinyl chloride, cellulose acetate, poly (methyl methacrylate), cellulose nitrate and their derivatives as well as numerous other compositions that are generally formed through various press moulding means into phonographic records or discs as well as similar thermoplastic structures having trackable groove contours and reproducing recorded monaural and stereophonic and video signals therefrom.

As is generally known, a phonograph cartridge serves to convert the variations on the walls of the grooves of a phonograph record into electrical signals whereby the variations or wavy pattern on the grooves determine the frequency and the amplitude of the sound vibrations. The cartridge includes a stylus or pickup needle usually in the form of a diamond or sapphire which generally has a hemispherical or ellipsoidal tip which rides or dips into the record groove and moves in response to variations of the pattern of said groove. The stylus, in turn, is generally attached to an armature which moves with the stylus to induce variations in an electrical or magnetic field in response to the stylus movement. This generates an electrical signal representative of the groove configuration which may then be amplified and used to drive speakers. Again, the stylus is caused to mechanically vibrate in response to the variations in amplitude and frequency of the undulations of the record groove wall which comprise the recorded signal.

A stylus has to track a plurality of evenly spaced groove contours with recorded signals on the order of between 15-20 and 20,000 Hz. Moreover, with the introduction of discrete four-channel record system or quadrasonic systems, a stylus must faithfully track grooves with recorded signals to cause vibrations of up to 50,000 Hz. As the stylus rides in the record groove, the relatively hard stylus wears away the relatively soft thermoplastic material of the record forming the groove. There has been heretofore no easy solution to alleviate the problem of record wear caused by the stylus riding in the groove contour of such recordings.

The deterioration of the sound quality of records with increase in the number of plays through wear of their tracks by repeated uses results in records becoming unusable and often being discarded within a short period of time. A number of factors is responsible for wear including the general wear through abrasive and adhesive wear mechanisms to an extent proportional to stylus loading. This loading is not only the deadweight stylus load on the record which may range from about 1 gram to 4 grams but also includes dynamic inertial forces caused by stylus mass and the frequency of stylus directional changes as it tracks the groove undulations. As known, reduction of deadweight load and stylus mass lowers the rate of groove wear but wear and the consequent loss of playback fidelity cannot be entirely eliminated. At any rate, most attempts of the prior art via record cleaners or alleged lubricates have simply resulted in cleaning only or depositing chemical films onto records without being successful in that such materials generally reduce the record fidelity due to rapid groove wear if cleaned or to hydrodynamic damping of the stylus tracking if oily substances are deposited. Further, it is often observed in the use of these materials that the noise level is increased due mainly to dust captured along with the formation of a tacky deposit upon the stylus. Moreover, it has been observed that attempts to use powdered solid lubricants such as graphite, molybdenum disulfide and the like have several disadvantages for they do not only reduce fidelity but also increase noise due to particulate interference in record grooves.

In general, various silicones and hydrocarbon waxes and certain fluorinated telomeric compositions have been used as lubricants in sundry applications. U.S. Pat. Nos. 3,067,262 and 3,345,424 discuss the manufacture of such fluorinated telomers. U.S. Pat. No. 3,067,262 discloses tetrafluoroethylene telomerized with trichlorotrifluoroethane whereby moderately high molecular weight products are produced. The patent discloses further that in order to obtain a wax-like product, a second active telogen must be included in the telomerization process. In general, such active telogens are hydrogen-containing compounds including tertiary hydrocarbons, aliphatic alcohols, divalent sulfur compounds, aliphatic tertiary amines, aliphatic ethers, carbonyl compounds and dialkyl phosphites. Since these active telogens contain hydrogen, the telomer products contain significant amounts of hydrogen, e.g., from 0.05 to 2% by weight.

U.S. Pat. No. 3,345,424 discloses an improvement over the telomeric compositions of U.S. Pat. No. 3,067,262 in that the improved compositions have no hydrogen and are of a lower melting point. In effect, the improved compositions are derived from the products obtained by telomerization of tetrafluoroethylene with certain haloalkanes. In fact, the compositions are made by chlorination of fluorination of certain fractions of telomer iodide mixtures whereby the iodine is replaced by chlorine or fluorine. The utility of these compositions is found in their application as a general dry lubricant, protective surface treatment, oil and water repellents, and a mold release and anti-stick composition.

In U.S. Pat. No. 3,652,314 to Castner, a method is disclosed for renewing, resurfacing and preserving a phonograph record by the steps of coating the record with a composition consisting essentially of acrylic polymer, polyethylene emulsion, a detergent, an ether and water, brushing the composition into the grooves, removing any excess, drying and playing the phonograph record.

In U.S. Pat. No. 3,857,865 an aqueous emulsion of ester lubricants of dibasic acids, polyoxyalkylene glycols and monofunctional alcohols is disclosed.

In U.S. Pat. Nos. 3,862,860 and 3,954,637, as well as 3,998,989, a method, composition and article are disclosed for improving lubricity, abrasion resistance, and lowering the coefficient friction of substrates such as photographic films, magnetic surfaces and other recording elements by applying to such substrates a solution comprising tetrafluoroethylene telomer and a copolymer of vinyl chloride and trifluorochloroethylene in a volatile solvent, drying and removing the excess, and substrates so lubricated. In effect it was shown that the combination of a lubricant, viz., tetrafluoroethylene telomer and nonlubricant, viz., poly (trifluorochloroethylene-co-vinyl chloride) provides a coefficient of friction below that of the lubricant per se.

In U.S. Pat. No. 4,071,460 a composition, method and article are disclosed consisting essentially of N-alkyl-substituted N,N-dialkanolamine and a halogenated hydrocarbon carrier. The compositions find utility for imparting wear resistance to surfaces having dynamic presentations thereon.

Further, Ser. No. 722,174, filed Sept. 10, 1976, my copending patent application, now U.S. Pat. No. 4,096,079 relates to a composition consisting essentially of halogenated organic solution of a low-molecular weight tetrafluoroethylene telomer and an antistatic agent. The composition is useful for treating recorded elements including phonograph records and the like.

SUMMARY OF THE INVENTION

The present invention, which provides a wear-resistant lubricous coating for phonograph records and the like is a solution comprising essentially an ester lubricant, and optionally a tetrafluoroethylene telomer or an antistatic agent, and a volatile solvent therefor. The compositions can be easily applied to any number of thermoplastic substrates generally used in the record or gramophone trade, upon which are recorded signals in the form of undulations or grooves, to provide a glossy coating that promotes a marked increase in lubrication properties thereof.

Accordingly, an object of the present invention is to provide a method which produces a phonograph record element having low friction characteristics.

An object of this invention is to provide a method and phonograph record article or similar plastic substrate having a greater extension of its playing life without any initial significant loss of frequency response or amplitude fidelity.

Another object of the present invention is to provide a composition and method which impart wear resistance to phonograph elements through a protective coating capable of bearing a momentary high load without any significant reduction in playing functionalities throughout a substantial number of plays.

Yet another object of the present invention is to provide a composition and method which produce a coating film on phonographic recording elements and the like which enhance the surface qualities of such elements, such as static discharge and appearance.

Still another object of the present invention is to provide a method by which the composition of the instant invention may be conveniently applied.

Another object of this invention is to produce a treated phonograph record or disc which after a large number of plays does not result in any substantial particle build-up on the stylus.

Still another object of the present invention is to provide a coated record surface having long life, great wear resistance and low surface friction.

Yet still another object of the present invention is to provide a phonograph record having both high lubricity and resistance to increase in noise and harmonic distortion through normal playings.

A further object of the present invention is to provide an improved, thin lubrication system for groove-tracking record elements having recorded audio and/or video signals stored thereon and which can be subjected to dynamic tracking means to render the signals recorded thereon.

These and other objects of the present invention will become apparent from the following description and discussion.

DETAILED DESCRIPTION OF THE INVENTION

According to the present invention, a composition is formed and is capable of imparting to various substrates, including a phonograph record, a low coefficient of friction, said composition comprising essentially about 0.001 to about 3.000 weight percent of a composition containing 10 to 100 weight percent of a carboxylate ester, 0 to about 90 weight percent of a tetrafluoroethylene telomer, and 0 to about 90 weight percent of an antistatic agent selected from the group consisting of amines, fatty quaternary ammonium compounds, fatty acid esters, phosphate esters and ethoxylated compounds, and about 97.00 to about 99.999 weight percent of a solvent therefor.

The ester lubricants of the preferred embodiment to be hereinafter described are soluble in the solvent and for the most part do not exist in the composition herein contemplated as particles or as colloidal suspensions. In effect, the composition of the present invention is generally an essentially homogeneous solution, that is, it exhibits a uniform composition throughout its entire volume.

The term "substrate" as used herein embraces various surfaces of articles to be treated by the compositions and refer to plastic substrates, metal substrates, combination of plastic and metallic substrates, and in particular to playing elements of synthetic, natural and combinations of thermoplastic materials and include resins, shellac, polyvinyl esters such as polyvinyl acetate, polyvinyl benzene, polyvinyl chloride, cellulose acetate, poly (methyl methacrylate), cellulose butyrate, cellulose nitrate, their derivatives as well as copolymers and blends thereof. In particular, the term "substrates" include those surfaces which are made of numerous compositions that are generally formed through various press molding means into phonographic records or discs as well as similar thermoplastic structures having trackable groove contours thereon which when used in conjunction with certain dynamic means such as styli are capable of following said contours and reproducing recorded monaural and stereophonic and video signals therefrom.

The compositions herein of the subject invention which impart to a given substrate a low coefficient of friction comprise a solution of a carboxylate ester lubricant including esters derived from alkalene glycol and polyoxyalkylene alcohols as well as esters in which the alcohol portion thereof is derived from halogenation of an aliphatic alcohol, especially fluoronation thereof. In general, the fluoroalkyl esters may be esters of monocarboxylic acid, viz., the flouroalkyl monoesters; the esters of dicarboxylic acid, viz., the fluoroalkyl diesters; esters of tricarboxylic acid, viz., the fluoroalkyl triesters; and esters of tetracarboxylic acid, viz., the fluoroalkyl tetraesters. Herein the fluoroalkyl esters are compounds derived from carboxylic acids by replacing the ionizable hydrogen atom by a fluoroalkyl radical.

The fluoroalkyl portion of the molecule is the alcohol moiety thereof and has generally from about two to about twenty carbon atoms. The preferred fluoroalkyl monocarboxylic acid esters are flouroalkyl acetate, fluoroalkyl laurate and fluoroalkyl stearate; the preferred fluoroalkyl dicarboxylic acid esters are fluoroalkyl malonate and fluoroalkyl azelate; and the preferred fluoroalkyl tricarboxylic acid ester is fluoroalkyl citrate. These fluroalkyl esters can be readily prepared by conventional chemical techniques known in the art. In general, the fluoroalkyl monoesters may be produced by condensation of fluoroalcohols with aliphatic monocarboxylic acids. Further, fluoroalkyl polyesters may also be readily produced by the reaction of fluoroalcohols with polycarboxylic acids, either of the aliphatic or aromatic type. Mixed esters are also readily produced such as those formed from the condensation products of pyromellitic anhydride with a mixture of fluoroalcohols.

The esters herein contemplated embrace those esters of terminally fluorinated alcohols in which a bridge containing an alkylene group is interposed between the fully fluorinated portion and the ester linkage. It is understood that the fluorinated alcohol may be a branched as well as a straight chain moiety.

In particular, the fluoroalkyl esters used in accordance with this invention may be readily prepared from the perfluoroalkyl aliphatic alcohols (viz., 2-perfluoroalkyl alkanols) of the formula $C_nF_{2n+1}(CH_2)_mOH$ where n is from about 3 to 14 and m is 1 to 3 and the corresponding carboxylic acid by art-known procedures. For example, esterification reaction may be readily carried out by using para-toluenesulfonic acid or sulfuric acid as a catalyst with the alcohol and carboxylic acid in benzene and heating these ingredients, removing the water of reaction by codistilling with the benzene and thereafter removing any residual by distillation to isolate the given esters. The perflouroalkkylethanols may be prepared by hydrolysis of fluoroalkyl hydrogen sulfates which in turn are produced from the reactions of perfluoroalkylethyl iodides with oleum, these reactions being described in U.S. Pat. No. 3,283,012. Also, the perfluoroalkylethyl iodides may be prepared by known reactions of perfluoroaklyl iodide with ethylene as described in J. Chem. Soc. 2856 (1949) and J. Chem. Soc. 2789 (1950) as well as by known telomerization reactions described in U.S. Pat. Nos. 3,132,185 and 3,234,294. Conventional separation techniques may be employed to isolate selected fractions as, for example, the corresponding iodides havin the perfluoroalkyl moiety in the range of 6 to 14 carbon atoms may be separated by distillation as set forth in U.S. Pat. No. 3,716,401.

The fluoroalkyl esters may generally be mixtures which can, if desired, be further refined by fractional distillation or chromatographic techniques. Nonetheless, the esters may cover a somewhat broad range; for example, a common fluoroalkyl ester such as fluoroalkyl malonate may generally be a mixture of esters having an average of about 70% to 80% perfluorohexyl to perfluoroheptyl-containing esters, with esters having a perfluorobutyl moiety and lower, less than about 5% and a perfluorodecyl moiety and higher, making up the balance.

The alkylene glycols used to form the carboxylate esters herein include ethylene glycol, propylene glycol, glycerol and trimethylene glycol. Further the polyoxyalkylene glycols used to form the carboxylate esters herein include polyethylene glycol, polypropylene glycol, polybutylene glycol, poly(ethyleneproplyene) glycol and the like. The polyoxyalkylene glycols of the preferred embodiment are those that contain 2 to 4 carbon atoms of the recurring oxyalkylene group and have a molecular weight below about 6000 for the polyoxyalkylene portion of the molecule.

The carboxylic acids herein contemplated that form the acid portion of the esters may contain from about 3 to 30 carbon atoms. The carboxylic acid moiety of the ester may be aliphatic, alicyclic, aromatic or hetercyclic and may be saturated or may contain double bond unsaturation, such as ethylenic unsaturation. Representative carboxylic acids for the esters herein contemplated are the fatty acids, both saturated and unsaturated and include acetic, malonic, butyric, isovaleric, azelaic, caproic, caprylic, capric, lauric, myristic, palmitic, palmitolic, stearic, oleic, ricinoleic, vaccenic, linoleic, linolenic, eleostearic, licanic, parinaric, arachidic, gadoleic, arachidonic, behenic, cetoleic, erucic, lignoceric, selacholeic and cerotic acids, with lauric, malonic, azelaic, stearic, citric, oleic and palmitic being preferred acids.

The polyoxyalkylene glycol monoesters and polyoxyalkylene glycol diesters may be represented, respectively, by the general formula:

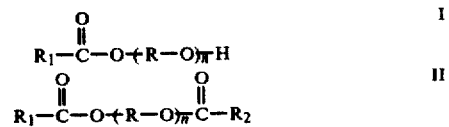

respectively, wherein $R_1$ and $R_2$ are alkyl radicals and R is a divalent radical having 2 to 4 carbon atoms and n is an integer from about 2 to 200. Illustrative of these mono- and diesters are the following compounds: Polyethylene glycol monostearate, polyethylene glycol distearate, polyethylene glycol monolaurate, polyethylene glycol dilaurate, polyethylene glycol monoleate, polyethylene glycol dioleate, polyethylene glycol monobehenate, polyethylene glycol dibehenate, and polyethylene glycol coco fatty acid esters.

To the compositions herein disclosed may be readily included certain low-molecular weight telomers of fluorocarbons, and especially telomers of tetrafluoroethylene. As used herein, the term "telomers" includes homotelomers and cotelomers and the term "telomerization" includes homotelomerization and cotelomerization and the term "low-molecular weight telomers"

means telomers having a maximum average molecular weight of about 3700.

One group of preferred telomers of this invention may be represented by the general structural formula:

$$R-(CF_2CF_2)_aX \qquad (I)$$

wherein R is a haloalkyl containing one to four carbon atoms, X is a member selected from the group consisting of chlorine, iodine, and fluorine and a is an integer from about 6 to about 16. A preferred composition of the present invention is one where X is chlorine or fluorine and the radical R is a group having the structural formula:

wherein $R_1$ and $R_2$ each independently represent perfluoroalkyl and monochloroperfluoroalkyl wherein each alkyl moiety has one to four carbon atoms. This tetrafluoroethylene telomer has been available commercially under the trade name MP-51. In general, these telomers are completely halogenated telomers, in that they do not contain hydrogen, and have a molecular weight range of about 800 to about 1800. A fuller description of these particular telomer compositions is given in U.S. Pat. No. 3,345,424.

Other groups of related and preferred telomers are those that have the formula:

$$R'(CF_2-CF_2)_bY \qquad (II)$$

wherein R' is a hydrogen-containing moiety of a telogen, said telogen being a member selected from the group consisting of tertiary hydrocarbons, aliphatic alcohols, divalent sulfur compounds, aliphatic tertiary amines, aliphatic ethers, aliphatic carbonyl compounds, dialkylamides, and dialkyl phosphites, and Y is chlorine or a chlorofluoroalkyl wherein the alkyl portion has one to two carbon atoms and where b is an integer from about 3 to about 50. In general, these tetrafluoroethylene telomers, as distinguished from the telomers mentioned above, contain hydrogen, e.g., from 0.05 to 2% by weight.

Hydrogen-containing tetrafluoroethylene telomers are available under the trademark Vydax AR. These telomers have a maximum average molecular weight of about 3700, a specific gravity of about 2.16, a melting point of 300° C., and are generally furnished at various concentrations including a 20% solid suspension in trichlorotrifluoroethane. These particular telomer compositions are generally described in U.S. Pat. Nos. 2,540,088 and 3,067,262.

It has been found possible to separate from Vydax AR a somewhat lower molecular weight fraction by the conventional expedients of extracting, decanting, filtering, or centrifuging. By such methods, a selected fraction is obtained where, in the above-mentioned structural formula II, b has a value of about 3 to about 8. In general, lack of turbidity or presence of clarity of the solution is found to be a good indication of such a selected fraction. The average molecular weight of this lower fraction is between about 400 and 900, the fraction being readily soluble in the herein described organic solvents. The melting point of this fraction is generally less than 120° C.

For the hydrogen-containing telomers, such as Vydax AR, it has been found, for certain preferred embodiments that the use of the lower molecular weight fraction, that is, the fraction having a molecular weight below about 900, results in favorable properties for certain end uses herein disclosed. Thus, during stylus tracking on a stereo or quadraphonic record coated with a composition of the present invention, there is observed no substantial wear particle build-up on the stylus as compared to an untreated record. Further, there is no actual clogging or inerference of the groove undulations even in a single alternation with a record at frequencies up to and including 45,000 Hz., which may occupy no more than about 0.0008 linear inches of space along the record groove.

In general, the concentration of the above-mentioned telomer additive can vary over a relatively broad range, but a range of about 2.0 weight percent to about 0.001 weight percent of the total weight of the composition has been found most effective. In practice, a concentration of between about 0.15 to about 0.005 weight percent has been found to be satisfactory for treating phonograph records.

An antistatic agent is not always required with the compositions of this invention. It has been noted in the course of work that some ester lubricants do exhibit the characteristic of effectively reducing static charge on a substrate without incorporation of a separate antistatic agent as such.

But an antistatic agent may be used, if desired, to render the compositions herein described more effective from a practical standpoint in that such compositions having incorporated therein said agent eliminate or substantially reduce the electrostatic charge on phonograph record surfaces to which such compositions are applied, thereby reducing the attractive forces which induce the migration of dust and other undesirable foreign particles to the record surface. The electrostatic charge can result from several causes, but is especially noticeable upon removing a record from its protective jacket, wiping its surface with cloth or brush, and otherwise contacting or buffing the record surface. Representative of one group of preferred antistatic agents found highly effective in the compositions herein are the tertiary amines, including the dialkanolamines. These amines have been found to be compatible in terms of solubility with the solvents herein disclosed.

The particular dialkanolamines found highly suitable for the herein described composition may be represented by the general structural formula:

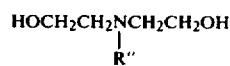

wherein R" is an alkyl having about four to about twenty carbon atoms. These dialkanolamines have a molecular weight of about 150 to about 400. Illustrative of such dialkanolamines are N,N-bis(2-hydroxyethyl)-dodecylamine, N,N-bis(2-hydroxyethyl)tetradecylamine and N,N-bis(2-hydroxyethyl)tetradecylamine. The dialkanolamines may be readily made by conventional chemical techniques known in the art. A process for preparing various N-alkyl substituted N,N-dialkanolamines is disclosed in U.S. Pat. No. 2,541,088.

Other suitable and preferred antistatic agents may be readily incorporated, if desired, into the compositions herein. Such agents should be soluble in the solvent employed. Thus other antistatic agents include fatty quaternary ammonium compounds, fatty esters, phosphate esters and ethoxylated compounds. The ethoxylated compounds include such compositions as polyethylene glycols as well as ethoxylated triglycerides, ethoxylated sorbitol and the like. The concentration of the antistatic agent can vary over a wide range so long as it is effective in reducing or removing electrostatic charge. When incorporated, a concentration of about 1.0 to about 0.001 weight percent based on the total composition has been found to be most effective.

The solvents utilized with the compositions of the present invention include organic compounds as well as water. While certain solvents are useful, provided there is no adverse effect upon the substrate, trichlorotrifluoroethane is particularly desirable as having suitable organic dissolution powers, high volatility, and essentially no physical or chemical effect on the substrate. The trichlorotrifluoroethane can be either isomer, i.e., it may be 1,1,1-trichloro-2,2,2-trifluoroethane or 1,1,2-trichloro-1,2,2-trifluoroethane.

Other useful solvents of the present invention, either individually or in miscible combinations, include the following:

| Alcohols | Ketones | Esters |
| --- | --- | --- |
| methanol | acetone | ethyl acetate |
| ethanol | methylethyl ketone | propyl acetate |
| n-propanol | methylpropyl ketone | isopropyl acetate |
| isopropanol | methylisopropyl ketone | butyl acetate |
| isobutanol | methylisobutyl ketone | |
| | diethyl ketone | |
| | ethylpropyl ketone | |
| | ethylisopropyl ketone | |

| Halogenated Hydrocarbons | Hydrocarbons | Ethers |
| --- | --- | --- |
| carbon tetrachloride | benzene | isopropyl ether |
| chloroform | tolulene | diethyl ether |
| methylene chloride | xylene | dioxane |
| methyl chloroform | pentane | |
| tetrachloroethylene | hexane | |
| trichloroethylene | heptane | |
| dichloroethane | octane | |
| dichloroethylene | | |
| perfluorodimethylcyclobutane | | |
| benzotrifluoride | | |

A preferred composition of the present invention consists of an ester lubricant, an organic solvent and optimally an antistatic agent which is, preferably, a tertiary amine as defined above.

Lubrication of substrates herein contemplated can be accomplished by applying the herein-described composition wherein the ester lubricants are generally present in a solvent in an amount less than three weight percent to a given substrate, evaporating the solvent therefrom, and lightly buffing, if desired, the thus-coated substrate to provide a clear coating. Application of the composition can be accomplished by numerous means including spraying, dipping, brushing, swabbing, flowing and doctoring. For most purposes, spraying and swabbing are preferred because of the complete and uniform coverage these methods afford.

There can be added to the composition of the present invention minor amounts of various conventional components including antioxidants, pigments, hardeners, fillers, binders, odorants, dyes and the like if there is need to do so and to the extent that such ingredients are soluble or dispersible in the solvent and do not degrade the performance characteristic of the present compositions.

The ester lubricants herein contemplated are those that are soluble in the aforementioned solvents and for the most part do not exist in the compositions hereindescribed as particles or as colloidal suspensions. In effect, the compositions of the present invention are generally essentially clear, homogeneous solutions, that is, each exhibits a uniform composition throughout its entire volume without any turbidity.

The ester lubricants herein contemplated and disclosed may be employed in amounts ranging from about 3.0 to about 0.001 weight percent based on the total weight of the solution, preferably from about 0.2 to about 0.01 weight percent and especially from about 0.1 to about 0.03 weight percent. The resulting treated article which also forms a part of this invention is made by applying the compositions to the surface and removing the carrier therefrom whereby there is deposited thereon a coating of the ester ranging from about 0.3 to 3 micrograms per square centimeter.

Treatment of the various substrates herein contemplated can be accomplished by applying the above-described compositions in a concentration generally less about three weight percent, evaporating the solvent therefrom to provide a coating or film thereon which comprises an ester. In practice a concentration of between about 0.1 and 0.03 weight percent has been found to be satisfactory for treating phonograph records. Further, it has been found advantageous to buff or polish after treatment to impart a good luster to the playing surface thereof.

There will be illustrated herein preferred examples of the lubricating compositions of this invention and method of using the same. The specific illustrations, however, are not intended to be a limitation upon the breadth of the invention. Generally, the invention taught herein is one in which a volatile but effective carrier transports therein an ester, the composition forming a film upon a given substrate after the solvent has volatilized.

EXAMPLE I

A solution was prepared comprising 99.96 percent by weight of trichlorotrifluoroethane (Freon TF) and 0.04 percent by weight of perfluoroalkyl citrate (this triester is available under the trademark Zonyl TBC from E. I. du Pont de Nemours & Co., Wilmington, DE), the average perfluoroalkyl moiety thereof ranging from heptyl to octyl. A clear homogeneous solution resulted and was sprayed onto a clean phonograph test record, National Association of Broadcasters (NAB) test record No. 12-5-98, the trichlorotrifluoroethane was allowed to evaporate, and the playing surface was lightly buffed to leave a thin coating of said ester thereon.

A stylus/groove coefficient of friction test was conducted on the phonograph record before and after the treatment described by measuring the change in the deceleration rate of the freely rotating phonograph record on a turntable, the deceleration change being caused by the engagement of the tone arm stylus with the record groove. This change in deceleration is converted to stylus/groove coefficient of friction by the following formula:

$$f = \frac{I_t (A_t - A_b) \sin 45°}{SR}$$

f = coefficient of friction.
$I_t$ = moment of inertia of total rotating system.
$A_t$ = angular deceleration for the total effects of stylus and turntable bearings.
$A_b$ = angular deceleration for the effect of the turntable bearings alone.
S = Stylus force on record.
R = mean record radius at groove where stylus is sliding.

Using the above formula the coefficient of friction before coating with the aforementioned citrate composition was 0.35 and after application of said composition the coefficient of friction was reduced to 0.18.

Another composition was prepared as above with the exception that 0.04 weight percent fluoroalkyl stearate was used in place of the aforementioned citrate, this monoester being available from E. I. du Pont de Nemours & Co., Wilmington, DE. The average perfluoroalkyl moiety of said monoester ranged from heptyl to octyl. The coefficient of friction of the untreated record was 0.33 where the treated record with the fluoroalkyl stearate gave a coefficient of friction of 0.11.

EXAMPLE II

Accelerated phonograph record wear tests were conducted on NAB test records which had been treated with the compositions hereinafter disclosed. The results achieved from cleaned and treated records were compared with the results of the wear test conducted on a cleaned test record which had not been treated in accordance with the present invention. A graduated scale was established ranging from a rating of zero for a clean, mint condition appearance to a rating of 100 for a surface heavily covered with wear debris. A test utilized a standard type automatic record turntable rotating at 33⅓ rpm type with the stylus on the tone arm adjusted to 9.5 grams load on the record surface. This high stylus load was used in order to accelerate the wear process and thereby provide better discrimination among record treatments. Various compositions of the present invention were applied to the record surfaces in accordance with the procedure described in Example I. Test results after 125 to 127 playing cycles are presented in the tabulation below:

| Phonograph Test Record Identification | Composition of Record Treating Solution: Trichlorotrifluoroethane plus the following (wt. %) | Record Surface Appearance at Test Termination and Relative Rating |
|---|---|---|
| A | 0.04 wt. % fluoroalkyl citrate (average perfluoroalkyl portion 7 to 8 carbon atoms) | Relatively clean surface scattered fine wear particles: Rating = 15 |
| B | 0.04 wt. % fluoroalkyl stearate (average perfluoroalkyl portion 7 to 8 carbon atoms) | Quite clean: scattered very fine particles: Rating = 7 |
| C | Control Record (Record cleaned via mild detergent) | Heavily covered with various sizes particles of wear debris: Rating = 100 |

The above examples show that compositions of the subject invention effectively prevent phonograph record groove wear, for the above test results indicate that the compositions herein described significantly retard wear over a large number of actual playings.

EXAMPLE III

A solution was prepared comprising 99.96% by weight of trichlorotrifluoroethane (Freon TF) and 0.04% by weight of perfluoroalkyl malonate, the perfluoroalkyl moiety average thereof ranging from heptyl to octyl. A clear, homogeneous solution resulted and was sprayed onto a clean phonograph test record, National Association of Broadcasters (NAB) test record No. 12-5-98, the trichlorotrifluoroethane was allowed to evaporate and the playing surface of the record was lightly buffed to leave a thin coating of diester thereon.

The stylus/groove coefficient of friction test was conducted in accordance with Example I. The stylus/groove coefficient of friction determined on the treated record was 0.18. In comparison, the coefficient of friction as determined on untreated NAB records averaged about 0.32.

The accelerated record wear test was also conducted on the treated record in accordance with Example II and resulted in the record having a very clean surface appearance indicatng very little record wear and gave a relative rating of 1.0.

EXAMPLE IV

A solution was prepared comprising of 99.97 percent by weight of denatured alcohol (90% ethyl alcohol, 5% methyl alcohol and 5% water) and 0.03 percent by weight of polyoxyethylene glycol monostearate, the molecular weight of the polyoxyethylene glycol portion being about 400. A clear solution resulted and was sprayed onto a phonograph test record, National Association of Broadcasters (NAB), the alcohol was allowed to evaporate, and the playing surface was lightly buffed to leave a thin coating of said monoester thereon. The record was then subjected to playing and compared with an untreated record to determine changes in any surface noise. For this purpose, the signal from the stylus, tracking at one gram load in the record groove, was fed to a Tektronix 5100 Series Storage Oscilloscope for display. During the first number of playings, the coated record showed significantly less surface noise than did an uncoated record; and progressively throughout some 120 playings, the level of background or surface noise of the coated record ultimately reached the noise level that the uncoated record showed on its first playing.

EXAMPLE V

A solution was prepared comprising about 99.02 weight percent of denatured alcohol (90% ethyl alcohol, 5% methyl alcohol and 5% water), about 0.05 weight percent polyoxyethylene glycol monostearate, and about 0.03 weight percent alkyldiethanolamine. The molecular weight of the polyoxyethylene glycol portion of the stearate ester was about 400, and the alkyl portion of the alkyldiethanolamine was $C_{12}$ to $C_{14}$. A clear solution resulted and was sprayed onto a NAB test record, the alcohol was allowed to evaporate, and the playing surface was lightly buffed. The accelerated record wear test as described in Example II was conducted on the treated record and resulted in the record having a very clean surface indicating very little record wear and gave a relative rating of 2.0.

EXAMPLE VI

Another series of accelerated phonograph record wear tests was conducted on NAB test records which had been treated with the compositions hereinafter disclosed. The results achieved from cleaned and treated records were compared with the results of the wear test conducted on a cleaned test record which had not been treated in accordance with the present invention. A graduated scale was established ranging from a rating of zero for a clean, mint condition appearance to a rating of 100 for a surface heavily covered with wear debris. A test utilized a standard type automatic record turntable rotating at 33⅓ rpm type with the stylus on the tone arm adjusted to 9.5 grams load on the record surface. This high stylus load was used in order to accelerate the wear process and thereby provide better discrimination among record treatments. Various compositions of the present invention were applied to the record surfaces in accordance with the procedure described in Example I. Test results after 125 to 127 playing cycles are presented in the tabulation below:

| Phonograph Test Record Identification | Composition of Record Treating Solution: Trichlorotrifluoroethane plus the following (wt. %) | Record Surface Appearance at Test Termination and Relative Rating |
|---|---|---|
| A | 1.0% tetrafluoroethylene telomer concentrate (20% solids) Vydax AR, (decanted), plus 0.02% polyethylene glycol monolaurate (mol. wt. of the polyethylene glycol portion was about 600) | Quite clean: a small number of fine wear particles: Rating = 3 |
| B | 0.03% polyethylene glycol monolaurate (mol. wt. of polyethylene glycol portion was about 600) | Very clean: a few fine wear particles: Rating = 2 |
| C | 0.06% fluoroalkyl stearate (average perfluoroalkyl portion was 7 to 8 carbon atoms) plus 0.04% polyethylene glycol monolaurate (mol. wt. of polyethylene glycol portion was about 600). | Very clean: a few fine wear particles: Rating = 3 |
| D | Control Record (Record cleaned via mild detergent) | Heavily covered with various sized particles of wear debris: Rating = 100 |

The above examples show that compositions of the subject invention effectively prevent phonograph record groove wear, since the compositions have been found to significantly retard wear over a large number of actual playings.

There have been disclosed herein a method of and a composition for lubricating surfaces, and in particular those surfaces which are capable of having or have dynamic presentations thereon. In view of this specification, those skilled in the art will have many modifications which fall within the true spirit and scope of this invention. It is intended that all such modifications be within the scope of the appended claims.

I claim:

1. A composition for imparting lubricity and wear resistance to a surface having dynamic presentations thereon comprising about 0.001 to about 3.000 weight percent of a composition containing a carboxylate ester, said ester being derived from a perfluoroalkyl alcohol of the formula $C_nF_{2n+1}(CH_2)_mOH$ wherein n is from about 3 to about 14 and m is 1 to 3 and an aliphatic carboxylic acid having about 3 to 30 carbon atoms, and an antistatic agent selected from the group consisting of amines, fatty quaternary ammonium compounds, fatty acid esters, phosphate esters and ethoxylated compounds, and about 97.00 to about 99.999 weight percent of a solvent therefor.

2. A composition of claim 1 wherein the amines are dialkanolamines and the solvent is a halogenated hydrocarbon.

3. A method of treating a surface to render said surface lubricous and wear resistant, which comprises the steps of treating the surface with a solution comprising about 0.001 tc about 3.000 weight percent of a composition containing a carboxylate ester derived from a perfluoroalkyl aliphatic alcohol of the formula $C_nF_{2n+1}(CH_2)_mOH$ wherein n is from about 3 to about 14 and m is 1 to 3 and an aliphatic acid selected from the group consisting of monocarboxylic and polycarboxylic acids said acids having about 3 to 30 carbon atoms, and an antistatic agent selected from the group consisting of amines, fatty quaternary ammonium compounds, fatty esters, phosphate esters and ethoxylated compounds, and about 97.00 to about 99.999 weight percent of a solvent therefor, and removing the solvent therefrom.

4. A method of claim 3 wherein the removing of solvent is accomplished by frictional contact with a moving member.

5. A method of claim 3 wherein the the solvent is a halogenated hydrocarbon.

6. A method of claim 3 wherein the amines are dialkanolamines and the solvent is a halogenated hydrocarbon.

7. A substrate having deposited thereon a composition comprising a carboxylate ester derived from a perfluoroalkyl alcohol of the formula $C_nF_{2n+1}(CH_2)_mOH$ wherein n is from about 3 to about 14 and m is 1 to 3 and an acid aliphatic selected from the group consisting of monocarboxylic and polycarboxylic acids, and an antistatic agent selected from the group consisting of amines, fatty quaternary ammonium compounds, fatty acid esters, phosphate esters and ethoxylated compounds.

8. A substrate of claim 7 wherein the ester is a fluoroalkyl ester selected from the group consisting of fluoroalkyl monoesters, fluoroalkyl diesters, fluoroalkyl triesters and fluoroalkyl tetraesters.

9. A phonograph record having deposited over the playing surface of said phonograph record a composition comprising a carboxylate ester derived fluoroalkanols having the formula $C_nF_{2n+1}(CH_2)_mOH$ wherein n is from about 3 to about 14 and m is 1 to 3, and an aliphatic acid selected from the group consisting of monocarboxylic acid and polycarboxylic acids, said acid having about 3 to 30 carbon atoms, and an antistatic agent selected from the group consisting of amines, fatty quaternary ammonium compounds, fatty acid esters, phosphate esters and ethoxylated compounds.

* * * * *